No. 725,704. PATENTED APR. 21, 1903.
J. L. HARVEY.
APPARATUS FOR MAKING TAPERS.
APPLICATION FILED JUNE 24, 1899. RENEWED SEPT. 12, 1901.
NO MODEL. 6 SHEETS—SHEET 1.
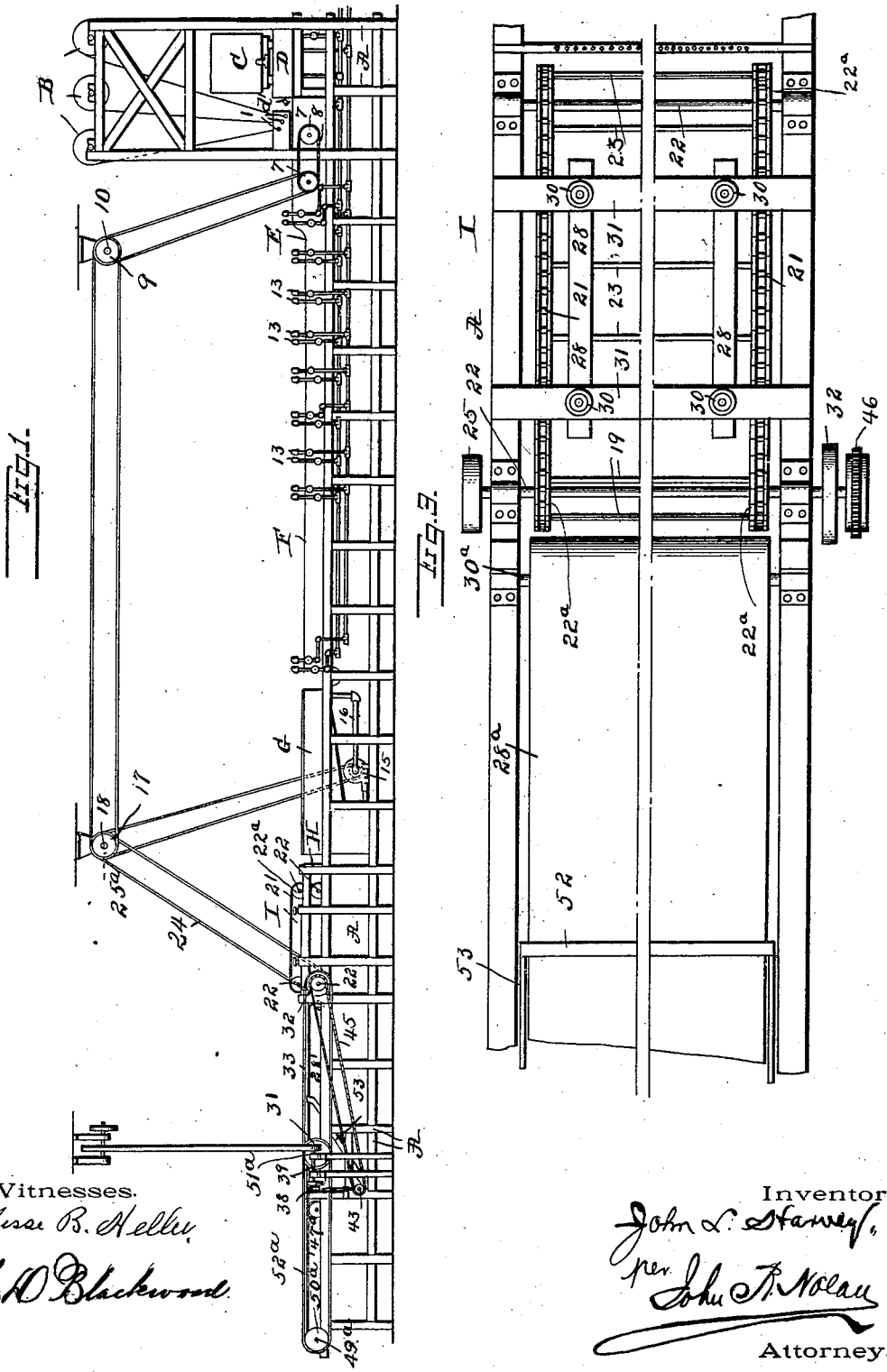
Witnesses.
Inventor.
Attorney.

No. 725,704. PATENTED APR. 21, 1903.
J. L. HARVEY.
APPARATUS FOR MAKING TAPERS.
APPLICATION FILED JUNE 24, 1899. RENEWED SEPT. 12, 1901.
NO MODEL. 6 SHEETS—SHEET 2.
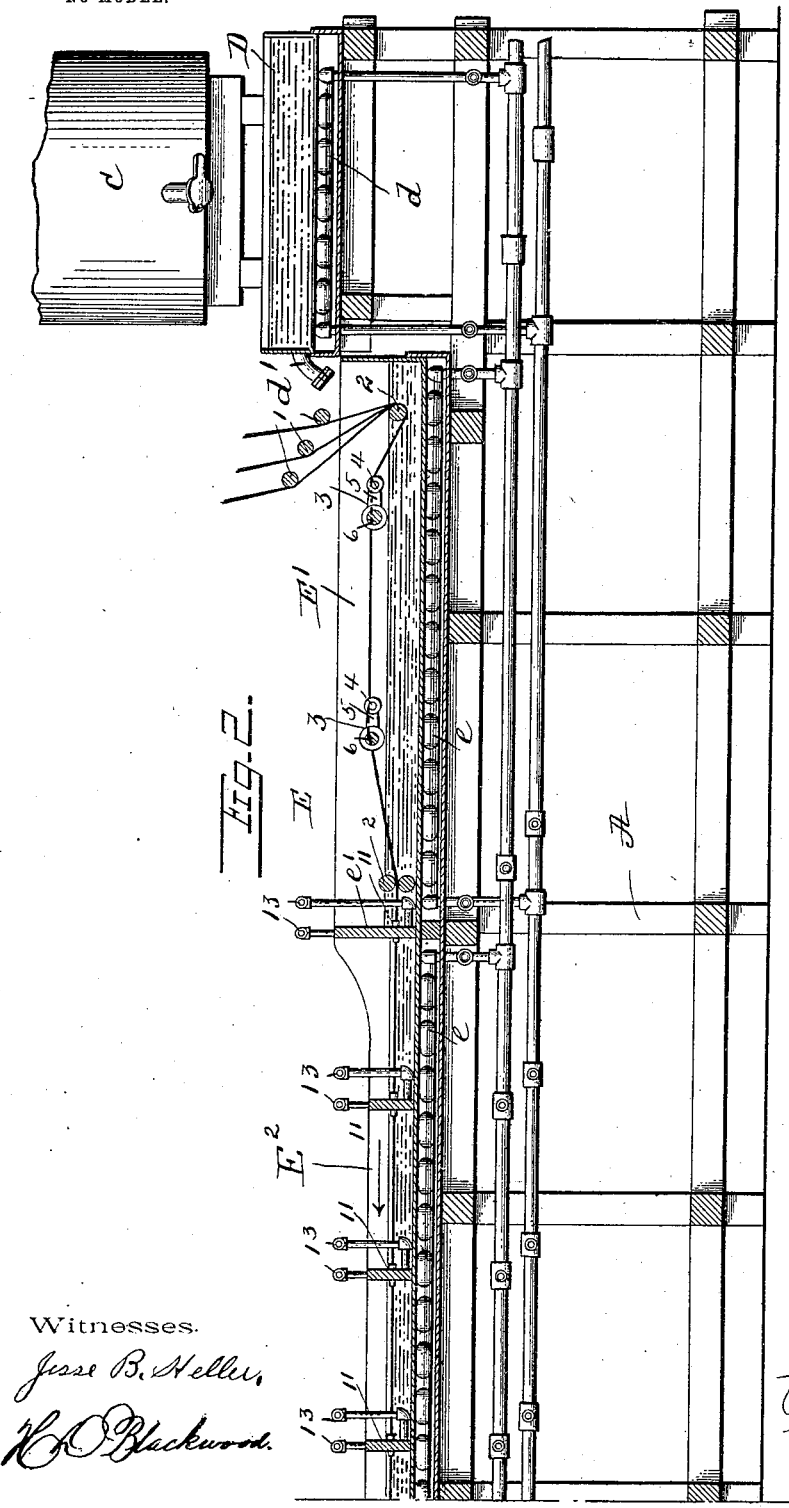
Witnesses.
Jesse B. Heller,
H. O. Blackwood.
Inventor.
John L. Harvey,
per John F. Nolan
Attorney.

No. 725,704. PATENTED APR. 21, 1903.
J. L. HARVEY.
APPARATUS FOR MAKING TAPERS.
APPLICATION FILED JUNE 24, 1899. RENEWED SEPT. 12, 1901.
NO MODEL. 6 SHEETS—SHEET 3.
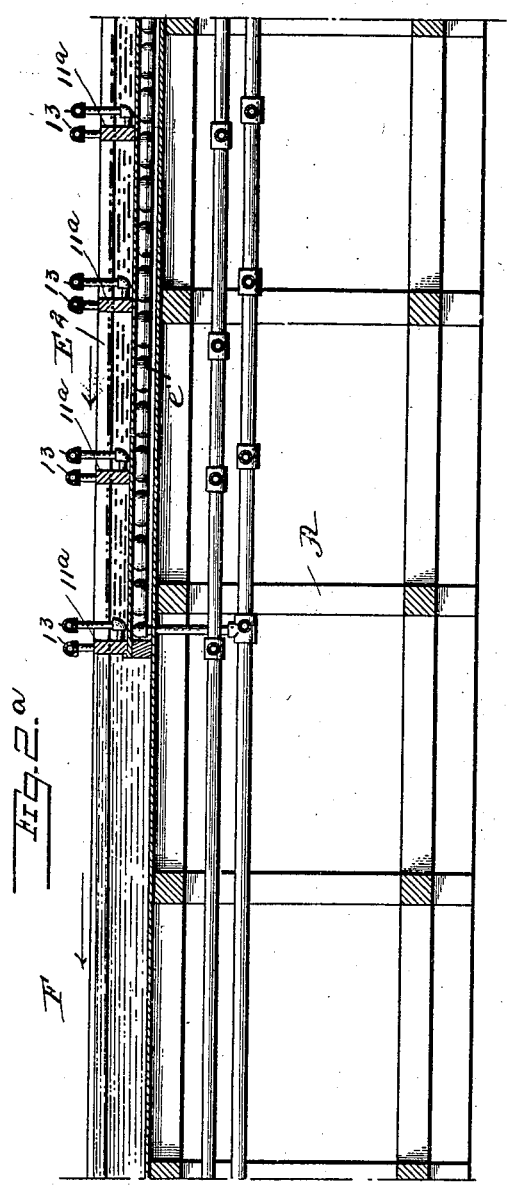
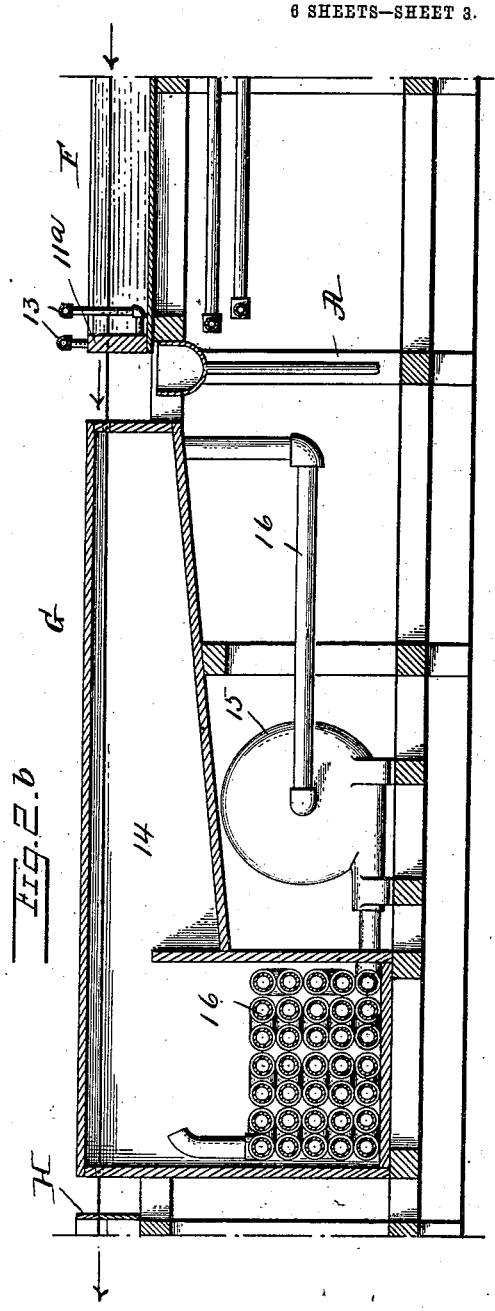
Witnesses.
Jesse B. Heller.
H. D. Blackwood.
Inventor.
John L. Harvey
per John R. Nolan
Attorney.

No. 725,704. PATENTED APR. 21, 1903.
J. L. HARVEY.
APPARATUS FOR MAKING TAPERS.
APPLICATION FILED JUNE 24, 1899. RENEWED SEPT. 12, 1901.
NO MODEL. 6 SHEETS—SHEET 4.
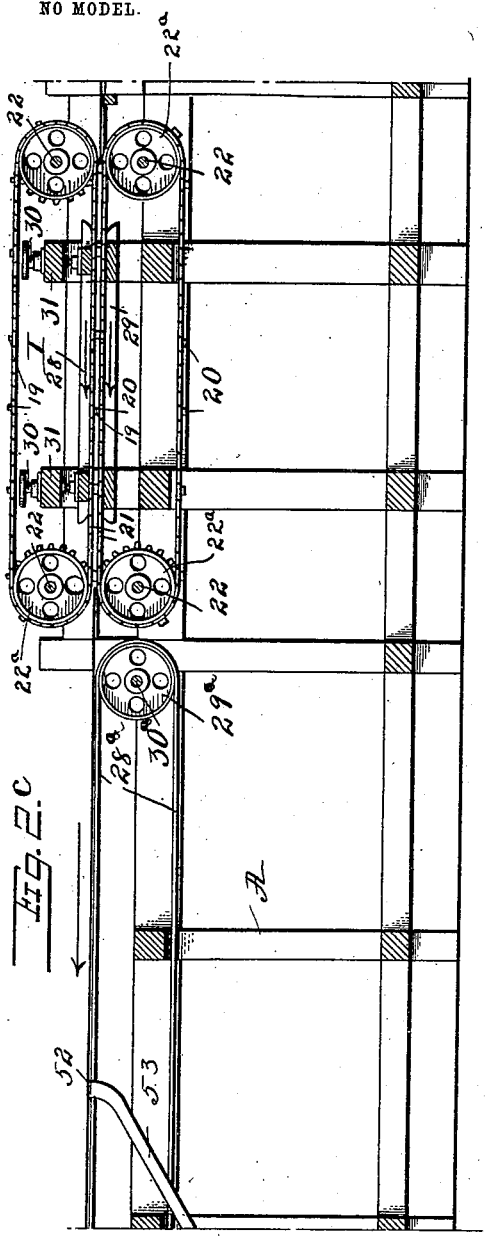
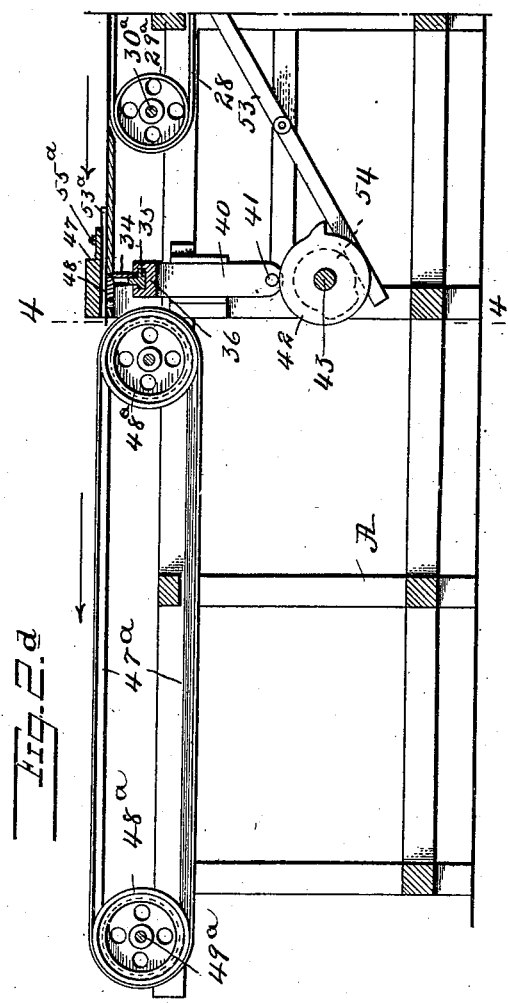
Witnesses.
Inventor.
Attorney.

No. 725,704. PATENTED APR. 21, 1903.
J. L. HARVEY.
APPARATUS FOR MAKING TAPERS.
APPLICATION FILED JUNE 24, 1899. RENEWED SEPT. 12, 1901.
NO MODEL. 6 SHEETS—SHEET 5.
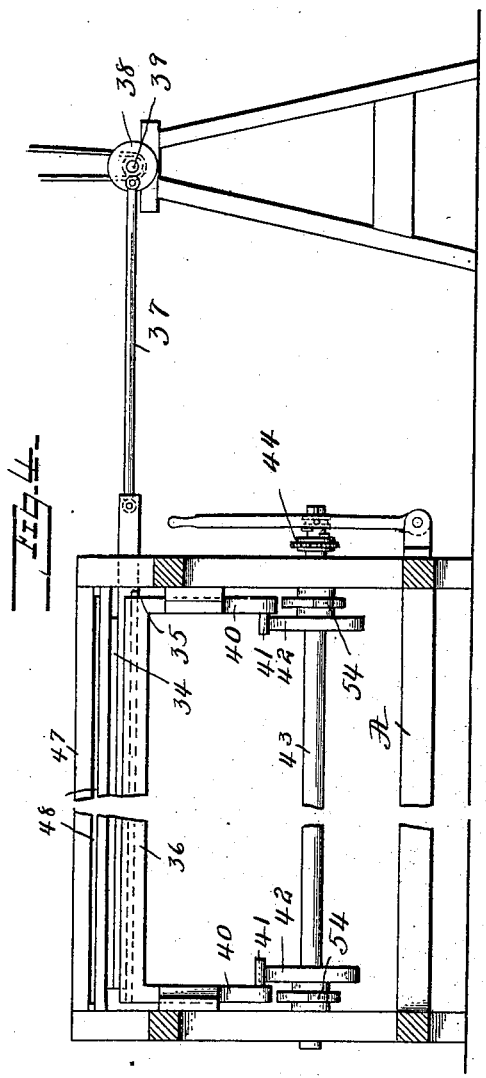
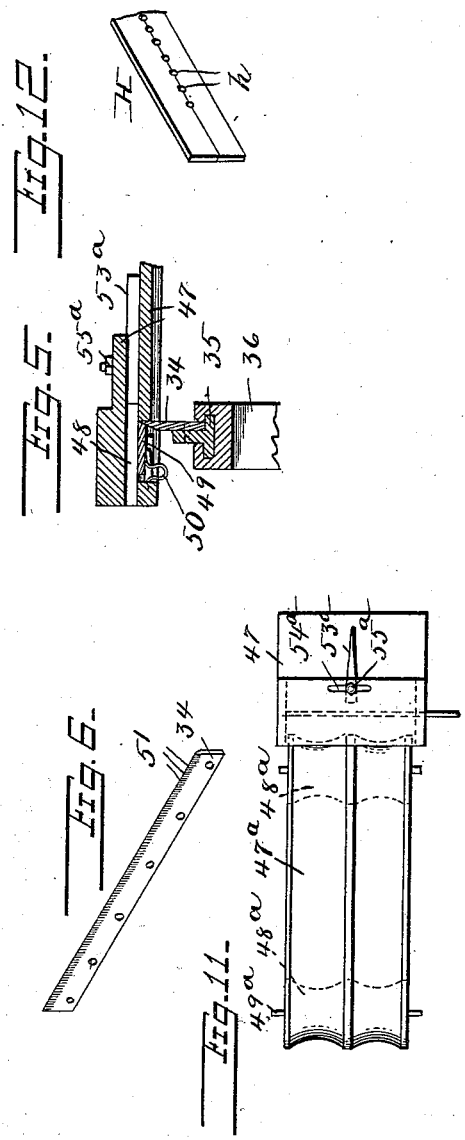
Witnesses.
Jesse B. Heller,
H. D. Blackwood.
Inventor
John L. Harvey,
per John F. Nolan
Attorney.

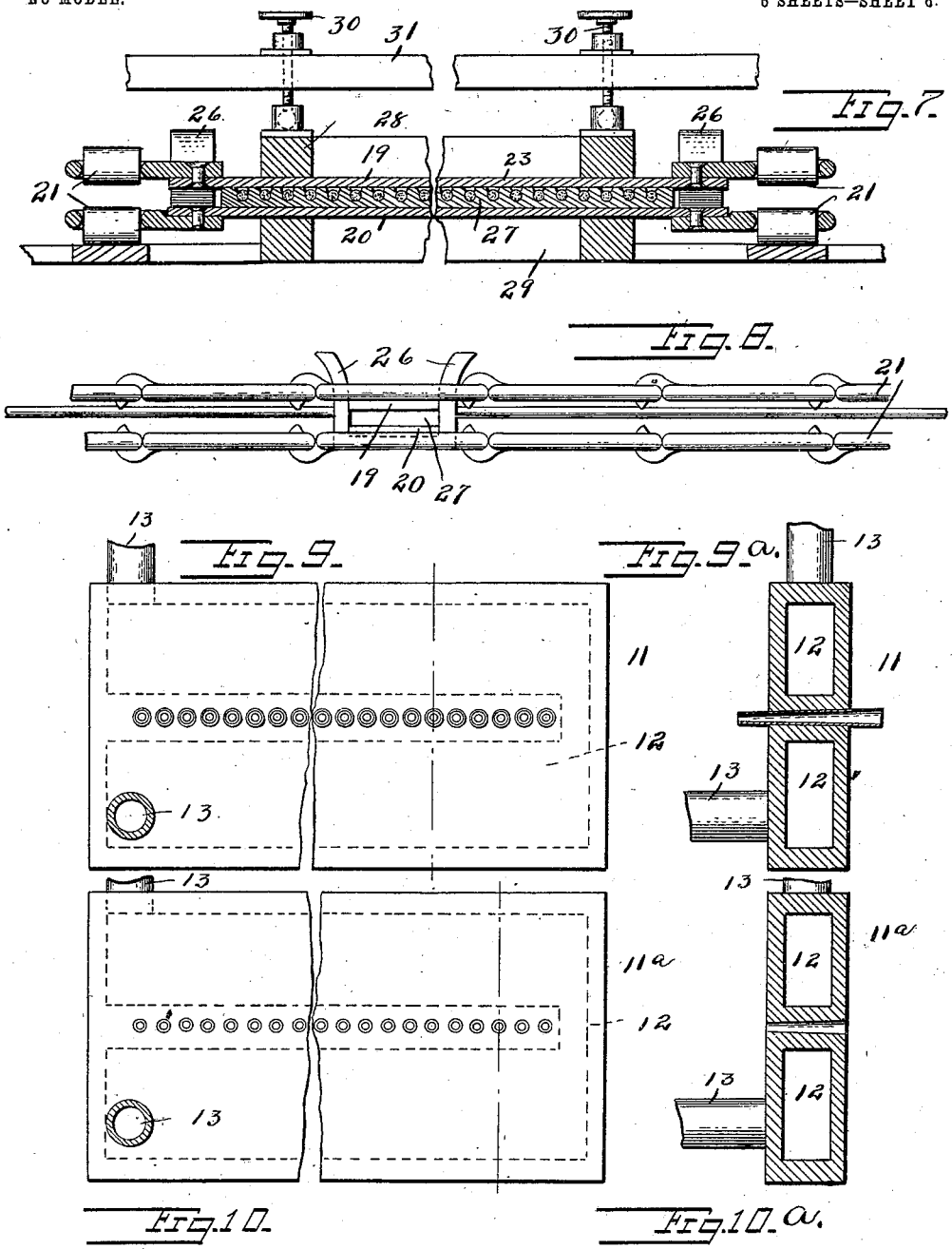

UNITED STATES PATENT OFFICE.

JOHN L. HARVEY, OF PHILADELPHIA, PENNSYLVANIA.

APPARATUS FOR MAKING TAPERS.

SPECIFICATION forming part of Letters Patent No. 725,704, dated April 21, 1903.

Application filed June 24, 1899. Renewed September 12, 1901. Serial No. 75,166. (No model.)

*To all whom it may concern:*

Be it known that I, JOHN L. HARVEY, a citizen of the United States, residing in the city and county of Philadelphia and State of Pennsylvania, have invented certain new and useful Improvements in Apparatus for Making Tapers, of which the following is a full, clear, and exact description, reference being had to the accompanying drawings, forming a part of this specification.

This invention relates to apparatus for manufacturing wax tapers. In accordance therewith the threads to be coated are taken in sets from a suitable source of supply to and through a thin paraffin composition, and thereby primarily saturated, thence through a series of tubular dies, by which the threads and composition are consolidated, thence through a bath of stiffer composition and through a series of relatively located dies therein, such latter composition cohering in mass to the previously-treated threads and being progressively condensed by the successive dies to a substantially uniform diameter, thence through a cold-water bath, by the agency of which the composition is chilled and set, thence through a cold-air chamber, wherein the composition is hardened. Thence the coated threads are preferably drawn through a stripper-bar, by means of which the superfluous material is removed from the threads and a smooth uniform product insured. In advance of this stripper are located impelling devices, by means of which the threads are pulled steadily and regularly through the baths and dies, and in advance of these devices is located an appropriate cutting mechanism, by means of which taper lengths are severed from the coated threads as rapidly as they are advanced. The tapers thus produced are delivered onto an off-bearing belt, and thereby separated in rows for convenience of handling and boxing.

The process being continuous and automatic enables the production economically and expeditiously of tapers of a superior quality.

In the accompanying drawings I have illustrated a simple and efficient apparatus whereby the tapers may be produced in pursuance of my invention, which apparatus obviously may be modified to meet particular requirements.

Referring to the drawings, Figure 1 is a side elevation of the apparatus. Figs. 2, $2^a$, $2^b$, $2^c$, and $2^d$ represent, collectively, a longitudinal section of the apparatus, on an enlarged scale, the said figures being successive continuations. Fig. 3 is a plan of the thread-pulling mechanism and the receiving-carrier adjacent thereto. Fig. 4 is a transverse section on the line 4 4 of Fig. $2^d$, showing the knife and its operating mechanism. Fig. 5 is a transverse section, enlarged, of said knife and adjuncts. Fig. 6 is a perspective view of the knife detached. Fig. 7 is a transverse section through a portion of the thread-pulling mechanism. Fig. 8 is a detail of said mechanism. Figs. 9 and 10 are side elevations of dies and their supports. Figs. $9^a$ and $10^a$ are transverse sections through Figs. 9 and 10, respectively. Fig. 11 is a plan of the taper-separating apron and the deflector. Fig. 12 is a detail of the stripper.

A is a substantial framework of sufficient length to support the various parts of the apparatus. Upon one end of this frame are mounted the beams B, from which are drawn the several sets or groups of threads to be coated. At this end there is also located a jacketed caldron C, in which the paraffin in solid form is melted. Below the caldron is a pan D, which is supplied with liquid paraffin therefrom, suitably-located steam-pipes $d$ being provided for the purpose of maintaining the paraffin at the desired degree of consistency. Below this tank is a long shallow tank E, along the bottom of which runs a series of pipes $e$, through which steam or other heating fluid is circulated. This tank is divided into two compartments E' and $E^2$ by means of a transverse portion $e'$. The compartment E lies directly below one end of the pan, and the latter is provided with a suitable cock $d'$, whereby the composition may be run therefrom into said compartment. (See Figs. 1, 2, and $2^a$.) The threads from the source of supply are immersed in this composition and saturated thereby, provisions being had whereby the threads are alternately dipped into and raised from the composition in a manner to insure their thorough saturation.

By thus moving the traveling threads into and out of the composition I find that a greater quantity of the substance will cling to the threads than if they be drawn directly through the bath. The threads are guided in their passage through the bath by means of rollers 1 2, Fig. 2, at the respective ends of the compartment, rotary crank-frames 3 (in this instance two) being arranged to take under the series of threads and insure their elevation and depression. These frames comprise wires or rods 4, fixed at their extremities to crank-arms 5 on transverse shafts 6, which are journaled in the side walls of the compartment and above the level of the composition. These shafts are provided with sprocket-wheels 7, which are geared together by a sprocket-chain 8. One of the shafts is belted with a pulley 9 on an overhead shaft 10 and driven thereby, the two frames thus being simultaneously rotated. (See Fig. 1.)

Extending transversely through the partition $e'$ is a horizontal series of tapering tubular dies 11, through which the respective sets of saturated threads are drawn, so as to consolidate the same and the composition thereon. That these dies may be kept heated the partition is provided above and below the same with intercommunicating spaces 12, through which steam is circulated by pipes 13, leading to and from the same. (See Figs. 9 and $9^a$.)

The compartment $E^2$, Fig. $2^a$, contains a composition of "stiffer" consistency than that contained in the first compartment and is provided at intervals throughout its length with a series of tubular dies $11^a$, through which the previously-treated threads are drawn. These dies and the supports therefor are identical in construction with the like parts above described, excepting the dies in the forward portion of the compartment, which are simply orifices in the hollow plates. (See Figs. 10 and $10^a$.) As the threads are drawn through the stiffer composition the latter coheres in bulk to the previous coating, and as they pass through the succeeding dies the composition is progressively compressed and consolidated into a homogeneous mass of the requisite diameter.

Arranged in advance of the composition-tank E is a tank F, Figs. 1, 2, and $2^b$, containing cold water, through which the coated threads are drawn for the purpose of "setting" the composition. This water-tank may comprise an additional compartment of the tank E, and, in fact, it is so illustrated in the drawings. The respective ends of the water-tank are provided with die-orifices, through which the coated threads are drawn and molded. Adjacent the water-tank is a cold-air chamber G, through which the threads are drawn and therein subjected to the solidifying action of the air. This chamber comprises a casing 14, into and through which a current of air is circulated from a fan 15, with suitable pipe connections 16. This fan is belted with a pulley 17 on an overhead shaft 18 and driven thereby, as indicated in Fig. 1.

Supported directly in front of the air-chamber is a thin metallic bar H, Figs. $2^b$ and 12, provided with a horizontal series of orifices $h$, through which the coated threads are drawn and superfluous material, if any, removed therefrom. This bar is termed a "stripper." It is preferably made in two parts with semicircular recesses, which when the parts are combined constitute circular orifices of the proper diameter. Forward of this stripper is a pulling mechanism I, by means of which the taper material thus produced is clamped and drawn onward in a horizontal plane, the operation of this mechanism being continuous and unremitting, so as to pull the material steadily and regularly through the composition, water, and air chambers above described and insure thereby the uniform treatment of the threads throughout their entire length. As illustrated in Figs. 1, $2^c$, 3, 7, and 8 of the drawings, this mechanism comprises two carriers 19 20, arranged to travel one above the other in a manner to receive and carry between their adjoining faces the taper material. Each of these carriers includes two endless chains 21, supported by sprocket-wheels $22^a$, whose shafts 22 are journaled in boxes on the main frame, said chains being arranged adjacent to the respective sides of said frame and being connected by crossbars 23, disposed at regular intervals apart throughout the length of the conveyer.

The two carriers are designed to travel in unison, so that the opposing faces thereof will travel in the same direction and their respective cross-bars register with each other in a manner to clamp between them the rows of taper material. Preferably the lower carrier is geared with and driven from the shaft 18 through the belt 24 and pulleys 25 $25^a$, respectively, and the cross-bars of said carrier are provided with sockets or jaws 26, which are designed to embrace the corresponding bars of the upper carrier in continuous succession, and thereby positively and accurately impel the latter. The outer faces of the bars of the lower carrier are provided with transversely-grooved strips 27, of rubber or other yielding material, into which the taper material is embedded and held, so as to obviate any liability of the crushing of the latter between the contacting faces of the bars.

In order to insure the effective clamping action of the opposing cross-bars of the respective carriers, I provide two parallel frames 28 29, respectively, between which said bars are adapted to travel. The lower frame is fixedly supported by the main frame of the apparatus, and the upper frame is adjustably supported, so that it may be pressed with more or less force upon the underlying contiguous cross-bars. The adjustment of the upper frame is attained by means of vertical set-screws 30, working in cross-bars 31 of the main frame.

In advance of the pulling mechanism above described is an endless apron 28ª, which is supported by suitably-arranged pulleys 29ª, whose shafts 30ª are journaled in boxes on the main frame, the forward shaft being provided with a pulley 31, which is connected with and driven from a pulley 32 on the driven shaft 22 of the lower carrier 20 by means of a belt 33. (See Figs. 1, 2ᶜ, and 3.) This apron receives the free ends of the coated threads and directs them to and across the path of a transversely-reciprocating cutter, which at predetermined intervals severs taper lengths from the material. This cutter, as shown in Figs. 2ᵈ, 4, and 6, comprises a horizontally-disposed knife 34, affixed to a slide 35, which is fitted to a guideway in a vertically-movable carriage 36. One end of the knife is connected, by means a link 37, with an eccentric 38 on a laterally-disposed shaft 39, which is driven from a suitable source of power, so as to effect the rapid reciprocation of the knife transversely of the machine.

The carriage is provided with depending arms 40, which are fitted to guides in the side standards of the main frame and are provided with studs 41, which rest upon cam-wheels 42, fast on a lower shaft 43. This shaft is equipped with a sprocket-wheel 44, which is geared, by means of a chain 45, with a similar wheel 46 on the forward power-driven shaft 22 of the lower carrier 20, and thereby driven at a prescribed rate of speed relative to that of the pulling mechanism. In this way the carriage is raised and lowered at certain intervals, so as to move the reciprocating cutter to and from the row of coated material with the effect stated.

A fixed supporting-plate 47 for the free ends of the taper material is arranged in proximity to the knife and is provided with a horizontal slot or guide 48, through which the material extends and by which it is supported as it is severed by the knife. The plate is vertically slotted for the passage of the knife, one side of which adjacent to its cutting edge slides against the edge of the slot. Bearing against the other side of the knife is a slide 49, which is fitted to guides in the plate and is held yieldingly in contact with the knife by a suitably-disposed spring 50. In this way any composition adhering to the knife is stripped therefrom and the cutting edge thus kept free and unclogged. I preferably bevel the cutting edge of the knife and provide it throughout its length with a multiplicity of fine kerfs or slits 51, which act similarly to minute saw-teeth to sever the material with a clean smooth cut.

In view of the fact that the material is being continually advanced to the knife by the pulling mechanism there is a tendency of the material in rear of the knife to be retarded and buckled by its impact with the latter. To obviate this, I arrange across the upper surface of the apron 28 a transverse bar 52, Figs. 2ᶜ and 3, over which passes the taper material on its way to the knife. This bar is supported at its ends upon the upper arms of levers 53, the lower arms of which extend against the under edges of appropriate cams 54, Fig. 2ᵈ, on the shaft 43, whereby as the knife severs the material the bar is slightly lifted, so as to raise the threads accordingly and prevent the buckling thereof. When the knife descends, the bar is returned to its normal position to permit the direct onward passage of the threads until another series of taper lengths are cut therefrom. In advance of the knife is arranged an endless off-bearing conveyer 47ª, onto which the tapers are delivered as rapidly as they are cut. This conveyer is supported upon double-concave rollers 48ª, the shaft 49ª of one of which is provided with a pulley 50ª, that is connected with and driven from a pulley 51ª on the forward shaft 30ª by means of a belt 52ª. (See Figs. 1, 2ᵈ, and 11.)

The rollers impart to the conveyer a double-concave surface in cross-section, the central division-rib of which separates into two rows or parcels the tapers delivered thereto to the end that the latter may be conveniently handled and transferred to suitable commercial boxes.

As a simple and efficient means whereby the number of tapers delivered to the respective concavities of the conveyer 47ª may be predetermined I dispose upon the plate 47 a laterally-adjustable wedge-block 53ª, the apex of which may be adjusted between the advancing coated threads in a manner to deflect a greater or less number thereof toward one side of the machine and above the knife. This block is fitted in the horizontal guide-slot of the plate 47 and is provided with a set-screw 55ª, which extends through a transverse slot 54ª in said plate and permits thereby the requisite adjustment of said block relative to the row of taper material. (See Figs. 2ᵈ, 5, and 11.)

I claim—

1. In apparatus for making taper material, a composition tank or vessel, means for drawing threads longitudinally therethrough, movable thread-controlling frames to move the threads into and from the composition during the traverse of the threads within the tank or vessel, and means for actuating said frames.

2. In apparatus for making taper material, a composition tank or vessel, means for drawing threads longitudinally therethrough, rotary thread supporting and dipping frames within said tank or vessel, and means for rotating said frames.

3. In apparatus for making taper material, a composition tank or vessel, means for drawing threads therethrough, and a series of dies in said tank or vessel arranged one in advance of the other and adapted to progressively compress and consolidate the threads and the composition thereon.

4. In apparatus for making taper material, a means for supplying the threads, a tank or vessel containing a thin composition by which the threads are saturated, an adjacent tank or vessel containing a stiff composition by which the saturated threads are coated, and a series of dies in said latter tank or vessel arranged one in advance of the other and adapted to progressively compress and consolidate the threads and the composition thereon.

5. In apparatus for making taper material, a means for supplying the threads, a tank or vessel containing a thin composition by which the threads are saturated, an adjacent tank or vessel containing a stiff composition by which the saturated threads are coated, a series of dies in said latter tank or vessel, a water-tank, a cold-air chamber, and means for pulling the threads through said tanks, dies and chamber.

6. In apparatus for making taper material, a means for supplying the threads, a tank or vessel containing a thin composition by which the threads are saturated, an adjacent tank or vessel containing a stiff composition by which the saturated threads are coated, a series of dies in said latter tank or vessel, a water-tank, a cold-air chamber, means for pulling the threads through said tanks, dies and chamber, and means for severing taper lengths from the coated threads.

7. In a taper-making apparatus, the combination with means for coating threads, of a thread-pulling mechanism comprising relatively driven carriers provided with coacting cross-bars between which the threads are clamped and thereby continuously advanced.

8. In a taper-making machine, the combination with means for coating threads, of a thread-pulling mechanism comprising endless carriers provided with coacting cross-bars between which the threads are clamped, means for impelling one of said carriers, and devices progressively connecting the adjoining cross-bars of the respective carriers.

9. In a taper-making machine, the combination with means for coating threads, of a thread-pulling mechanism comprising endless carriers provided with coacting cross-bars between which the threads are clamped, means for impelling one of said carriers, and lugs or projections on the driven carrier adapted to coact with the bars of the other carrier.

10. In a taper-making machine, the combination with means for coating threads, of a thread-pulling mechanism comprising two endless carriers provided with coacting cross-bars whereof those of one carrier are provided with transversely-grooved strips of yielding material, and means for concertedly impelling said carriers.

11. In a taper-making machine, the combination with means for coating threads, of a thread-pulling mechanism comprising two endless carriers provided with coacting cross-bars whereof those of one carrier are provided with transversely-grooved strips of yielding material, and means for concertedly impelling said carriers, together with means for regulating the pressure of the opposing bars.

12. In a taper-making machine, the combination with means for supplying threads, a composition tank or vessel, mechanism for longitudinally drawing said threads therethrough, and means for moving the threads into and from the composition during their traverse, of a stripper device through which the coated threads are drawn, and superfluous coating removed therefrom.

13. In a taper-making machine, the combination with mechanism for pulling and feeding rows of coated threads, a transversely-reciprocating knife or cutter, means for moving the same across the path of said threads, and a take-up device between said knife and the feeding mechanism for preventing buckling of the threads.

14. In a taper-making machine, the combination with mechanism for pulling and feeding rows of coated threads, an endless apron onto which said threads are delivered, a transversely-reciprocating knife or cutter, and means for moving the same across the path of said threads, of a transverse take-up bar across which pass the said threads on their way to the knife, and means for raising and lowering said bar relatively to the operation of the knife.

15. In a taper-making machine, the combination with a mechanism for pulling and feeding rows of coated threads, of a transversely-reciprocating knife or cutter, means for moving the same across the path of said threads, and means for clearing coating from the sides of the knife.

16. In a machine for making wax tapers, the combination with means for supplying threads, means for coating the threads with composition, means for impelling said threads, and cutting mechanism for the taper material, of an off-bearing belt adjacent to said mechanism having a series of longitudinal spaces or compartments into which the tapers are delivered and thereby separated in rows, and means for driving said belt.

17. In a machine for making wax tapers, the combination with means for supplying threads, means for coating the threads with composition, means for impelling said threads, and the cutting mechanism for the taper material, of an off-bearing belt adjacent to said mechanism, double-concave rollers on which said belt is supported, and means for driving said belt.

18. In a machine for making wax tapers, the combination with a source of thread-supply, and a composition-bath in which the threads are coated, of a wall or plate provided with intercommunicating spaces through which steam is circulated, and provided also with a row of transverse tubes or orifices through which said threads are drawn.

19. In a machine for making wax tapers, the combination with the cutting mechanism, of means adjacent thereto for laterally deflecting said material preparatory to its severance.

20. In a machine for making wax tapers, the combination with the cutting mechanism for the taper material and the off-bearing belt adjacent thereto, of means for laterally deflecting said material preparatory to its severance.

21. In a machine for making wax tapers, the combination with the cutting mechanism for the taper material, and the off-bearing belt, of the adjustable deflecting-block adjacent to the cutting mechanism.

In testimony whereof I have hereunto affixed my signature this 21st day of June, A. D. 1899.

JOHN L. HARVEY.

Witnesses:
JOHN R. NOLAN,
ANDREW V. GROUPE.